Nov. 8, 1966  R. G. ALLEN ETAL  3,283,981
FILM ADVANCING ROLL

Filed April 26, 1962  3 Sheets-Sheet 1

INVENTORS
ROBERT GENE ALLEN,
VERNON PAUL FRUEHAUF,
BY Robert W. Black
AGENT

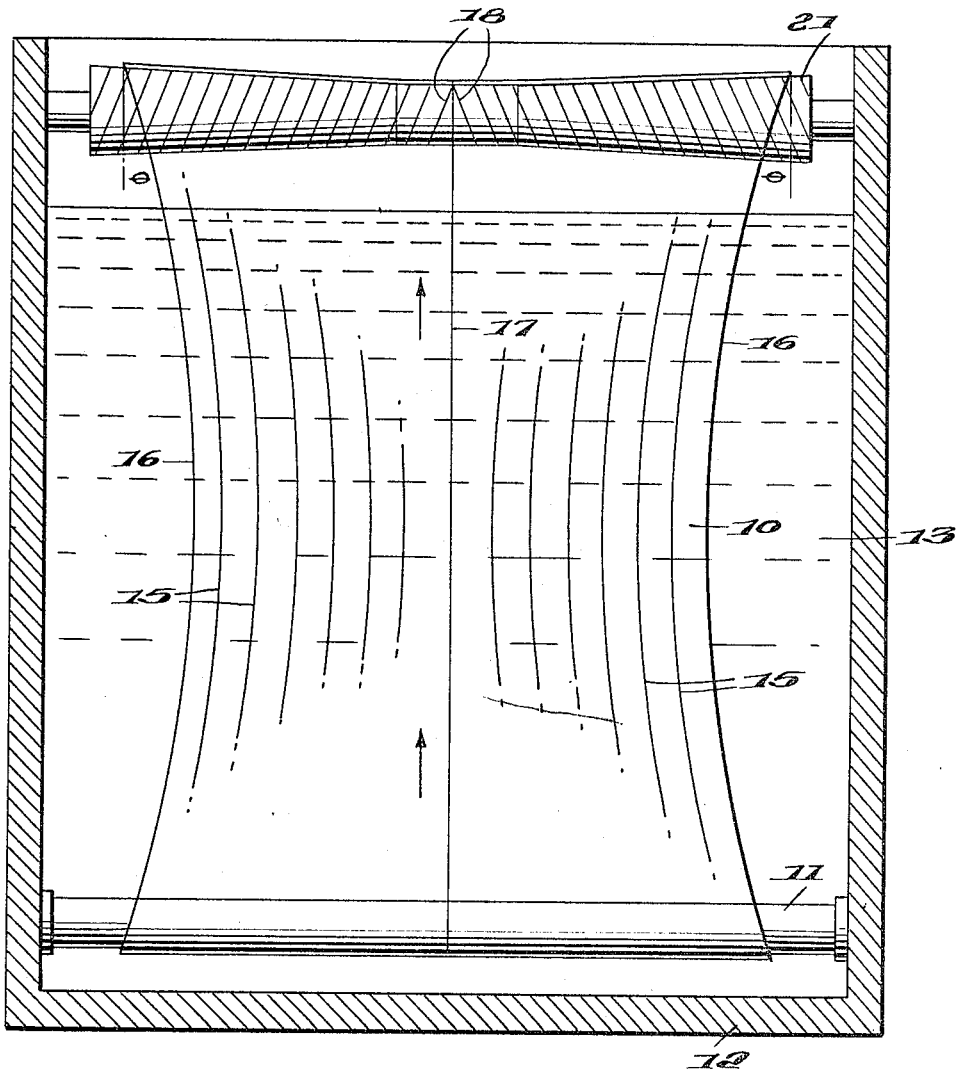

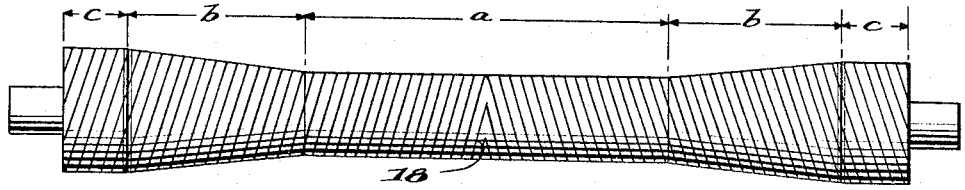
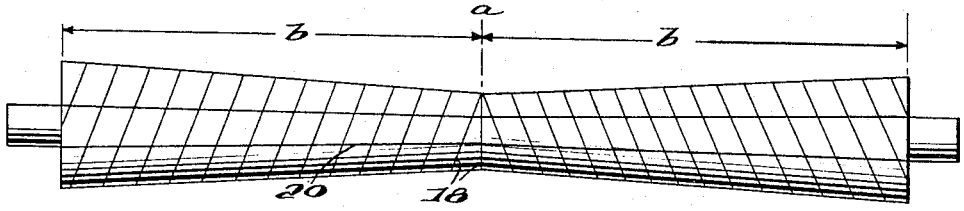
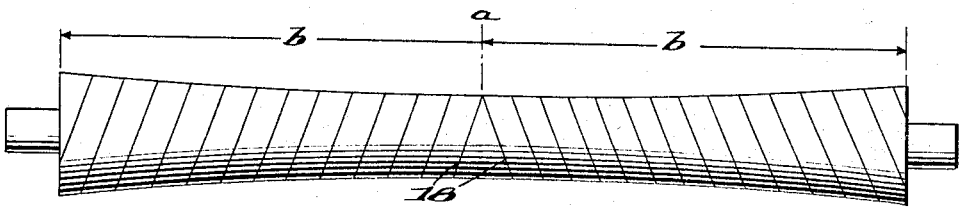
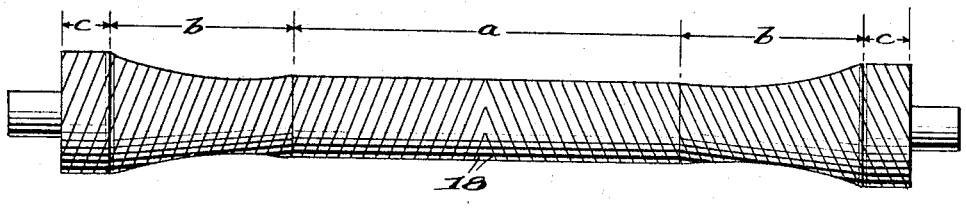
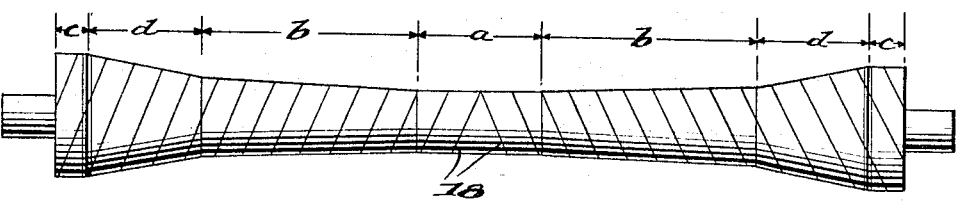

and Vernon P. Fruehauf, Snyder, N.Y., assignors to E. I. du Pont de Nemours and Company, Wilmington, Del., a corporation of Delaware
Filed Apr. 26, 1962, Ser. No. 190,493
4 Claims. (Cl. 226—190)

This invention relates to the manufacture of non-fibrous films and more particularly to an improved apparatus and process for advancing thin, non-fibrous film through treating liquids without wrinkling and folding.

The process of this invention is generally applicable in the preparation of thin, non-fibrous films which are passed through liquid treating baths during their manufacture. However, because of the commercial importance of regenerated cellulose film derived from viscose, such films constitute the preferred material for treatment in accordance with the principle of the present invention and the invention will be described hereinafter with specific reference to the preparation of regenerated cellulose films free of wrinkles and folds.

Regenerated cellulose films are usually prepared by extruding an alkaline solution of cellulose xanthate (viscose) through a long, thin casting die or hopper into a sulfuric acid-sodium sulfate coagulation-regeneration bath, which first coagulates the cellulose xanthate as a coherent sheet of film, then decomposes the xanthate to produce a highly swollen, moisture laden gel film of regenerated cellulose. The freshly formed gel film is subsequently passed through a series of liquid treating baths to wash, desulfurize, bleach and plasticize the film to remove impurities, improve its brightness, flexibility and strength. The purified and plasticized film is then dried while passing over a series of heated drums and collected into roll form for storage or for further process treatment, such as the application of a moistureproof coating.

While passing through the various liquid treating baths, the gel regenerated cellulose film is caused to follow a sinuous path up and down between guide means positioned alternately at the top and bottom of each liquid treating tank to increase the distance of travel through each bath. Usually, the guide means located above the treating bath are positively driven rolls which, because of their rotation, advance the film through the bath, while the lower guide means are smooth stationary tubes over which the film is drawn while being lubricated by the treating liquids. Because of the friction between the film and stationary guide means and the resistance or drag of the treating liquids to the travel of the film, it is necessary to apply some tension to advance the film through the baths. In general, higher tensions are necessary at the higher casting speeds.

Since gel regenerated cellulose films are rather fragile, weak and extensible, the tension applied to them during their passage through the treating liquid causes them to stretch in the machine direction and to "neck-in" or decrease in width in the transverse direction to an extent which depends upon the magnitude of the tension and the distance between the guide means. The necking-in of the film, resulting from an unbalance in the transverse and machine direction tensions, often tends to cause the various lanes of film to shift toward the center lane, thus creating wrinkles in the center of the web. To overcome this difficulty, it has been common practice to cause the film to pass over a series of stationary convex guide means, immersed in the baths, which impart transverse tension to the film (see U.S. Patent 2,916,767, to Stevens). Another method frequently used to eliminate center wrinkles in gel film is to employ upper advancing rolls having twin spiraled, grooved surfaces with two grooves of equal but opposite pitch originating at the center of the roll and extending outward toward opposite ends of the roll.

The two methods just described to prevent and eliminate wrinkling and folding of gel regenerated cellulose films have proven to be quite adequate in the past in producing films of unit weights of about 30 gms./M² or greater. However, recent improvements in the viscose process disclosed in U.S. Patents 2,962,766 and 2,991,510 to Hinkle and Stults, and Ingersoll, respectively, now make it possible to produce at high speeds very thin regenerated cellulose films with good durability, but unfortunately, the known means for preventing wrinkles and folds are inadequate in producing such films.

It appears that gel regenerated cellulose films thinner than about 30 gm./M² tend to stretch unduly at the edge lanes as the film passes between the various spaced-apart upper and lower guide means. The degree of edge lane stretching of such thin films appears to increase as a direct function of film speed, but as an inverse function of film thickness. Because of abnormal stretching of the edge lanes of thin gel films, they are prone to severe wrinkling and folding at the edges as well as in the center lanes.

When thin films are passed through the treating liquids in the usual manner employing convex stationary guide means in the early baths and spiral-grooved advancing rolls in the remaining baths, center wrinkles and folds are prevented or eliminated; however, edge wrinkles and folds are not prevented, except at very low casting speeds (about 50 y.p.m. or less) which requires less tension to be applied to the gel film. Prior to the present invention, it was the practice to slit off and discard as waste the wrinkled and folded edges of very thin films of regenerated cellulose cast at high speeds, since to do so was actually more economical than to eliminate the edge wrinkles and folds by decreasing casting speed.

It is an object of this invention to provide an improved apparatus and process for advancing thin, non-fibrous film without wrinkles and folds.

A further object of this invention is to provide an improved apparatus and process for advancing gel regenerated cellulose film through liquid treating baths without causing wrinkles and folds at the edges of the film. These and other objects will appear hereinafter.

These and other objects of this invention are accomplished by the improved process for advancing thin, non-fibrous, extensible films comprising passing a web of said film under tension around and in contact with at least one positively driven roll having a roughened surface rotating about a straight, fixed axis such that the edges of said film contact outwardly tapering sections of said roll at a point where the diameter is at least 0.2% greater than the diameter of the center of the roll.

The problem solved by the apparatus and process of the invention are more fully described hereinafter with specific reference to the accompanying drawings, wherein:

FIGURE 2 is a diagrammatic sectional view of the same tank as shown in FIGURE 1 in which a film advancing roll of the present invention is employed; and FIGURES 3 to 7 are diagrammatic views of film advancing rolls of the present invention of various designs.

Figure 1:
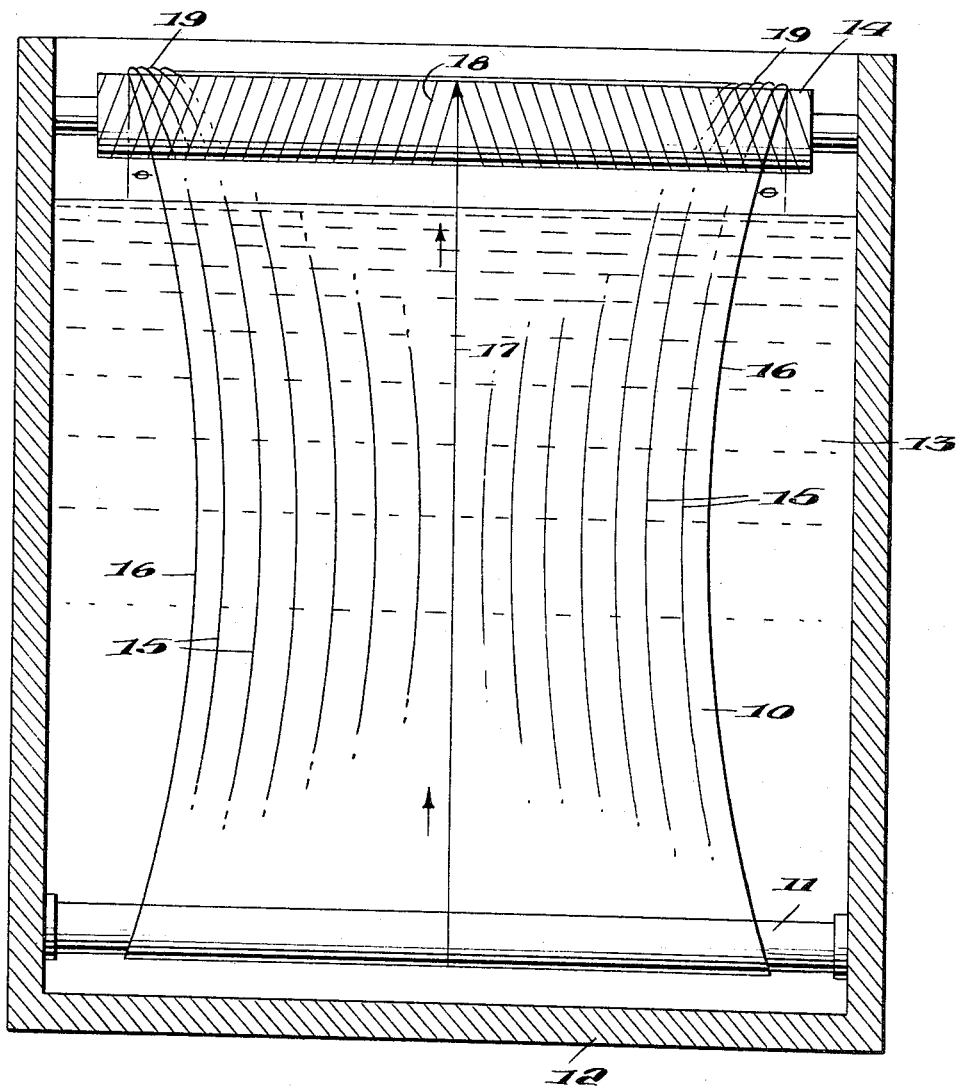
FIGURE 1 is a diagrammatic sectional view of a typical liquid treating bath tank in which a common positively driven spirally grooved cylindrical roll is employed.

Referring to FIGURE 1, a web of thin, transparent gel film 10 is advanced from stationary, cylindrical guide bar 11, located near the bottom of tank 12, up through treating liquid 13 by means of a common spirally grooved, cylindrical roll 14, mounted above the liquid level, which is positively driven by means not shown. Because of the friction between the film 10 and guide bar 11 and the resistance offered by the treating liquid 13, film 10 "necks-in" with loss in width, ripples 15 develop, and the edge lanes 16 stretch and becomes longer than the center lane 17. As the film 10 passes over and around roll 14, the spiral grooves 18 exert a transverse thrust on the film 10 outward from the center, thus smoothing out the ripples 15 in the inner lanes. However, the edges lanes 16, being somewhat longer than the inner lanes, do not sufficiently contact the cylindrical body of roll 14 to be smoothed by the spiral grooves. Beceause of the "necking-in" of the film 10 and the spreading and smoothing action of the spiral grooves 18 of roll 14, the edge lanes 16 approach roll 14 at an angle $\theta$; hence, the loose edge lanes 16 are caused to "bunch-up" and to' form wrinkles and folds 19 as they pass over roll 14. Once formed, the wrinkles and folds 19 remain in the film 10, preventing proper treatment during further processing through the liquid baths, and eventually become permanently creased into the film 10 during the drying step. Since the defective edge lanes are unsuitable for use, they are slit off and discarded as waste, thus increasing the overall cost of production.

The problem described above is overcomed by employing a concave, spirally grooved advancing roll as illustrated in FIGURE 2. From this figure, it will be observed that, although the film 10 "necks-in" to form ripples 15 and to stretch the edge lanes 16 which causes the edge lanes to approach the advancing roll 21 at an angle $\theta$, no wrinkles or folds are formed as the edge lanes pass over and around the roll 21. Wrinkles and folds do not form because the concave tapered roll 21 provides a longer peripheral travel path for the stretched lanes 16 which takes up the slack and allows the edges 16 to make sufficient contact with the roll 14 to be smoothed by the combined action of the spiral grooves and the outwardly tapering surface of the roll 21. Experience has shown, contrary to expectations, that the film 10 does not shift either to the right or left as a result of unbalance in the spreading action at the two edges 16. Apparently, the spiral grooves provide sufficient transverse traction to the film to prevent shifting regardless of the generally unfavorable web centering characteristics inherent in a concave guide roll. Generally, a web passing around a non-cylindrical roll shifts toward the higher portion. Hence, convex rolls have excellent centering action, while concave rolls cause an unstable situation, since the film tries to shift sideways in both directions at the same time. It is highly improbable that transverse forces to right and left on the film will always remain in balance, hence one normally expects a web to shift sideways and possibly "run-off" one end of a concave guide roll.

A preferred advancing roll for processing thin gel regenerated cellulose films of about 70 inches width through liquid treating baths is a positively driven roll made of some non-corrosive material, such as stainless steel or polyvinyl chloride, having a total length of 82 inches, a 40-inch cylindrical section of about 4½ inches in diameter, separating two conically tapered sections having small ends of the same diameter adjacent to the center section and a diameter 0.2 to 2% greater at the larger ends, each of which meet a 6-inch cylindrical end portion of equal diameter, and having three twin sets of parallel, spiral surface grooves about ¹⁄₁₆ inch deep, ⅛ inch wide and ⅓ inch apart, originating at the center of the roll and extending outward toward the ends with equal and opposite pitch.

In general, it is preferred that all of the advancing rolls used to moved thin gel regenerated cellulose films through the various treating baths be of the concave-grooved type just described; however in actual practice, it has been found possible to achieve satisfactory results under favorable conditions by employing concave-grooved rolls only in critical positions at which the gel film tends to swell and become more limp, for example, in the cold wash tanks.

For satisfactory results with the preferred rolls, it is necessary that the rolls be mounted and driven in the direction that causes the spiral grooves to exert a thrust outward from the center of the film. Preferably, the width of the gel film being processed be such that its edges contact the tapered sections where the diameter is at least 0.2%, greater than the diameter of the center of the roll. The concave-grooved rolls should be positively driven at a peripheral speed slightly greater than the speed of the film moving through the treating baths.

From the foregoing considerations, it is readily apparent that the success of the present invention does not depend upon the use of an advancing roll of any specific configuration, but rather upon the use of a roll that provides travel paths for the edges of thin films that are at least 0.2% greater than the travel path of the center lane and has a surface sufficiently rough to prevent any appreciable lateral shifting of the entire film.

Although the preferred method for achieving the desired roughness of the advancing roll is to provide at least one pair of thin spiral grooves originating at the center of the roll and extending outward toward opposite ends of the roll with equal and opposite pitch, spiral grooves are not absolutely necessary since unaided by spiral grooves, the tapered end of a concave roll exerts reasonably satisfactory edge smoothing action, providing there is good traction between the roll and film. For example, a concave roll may have a series of circular grooves around its circumference to provide the necessary transverse traction, and have a series of longitudinal grooves parallel to the roll axis to provide peripheral traction necessary for advancing the film over and around the roll. In general, grooves are preferred because they provide means for draining off excessive liquid from between the film and roll which would otherwise diminish traction; hence, the use of grooved rolls eliminates the necessity for scraping off excess liquid as the film approaches each positively driven advancing roll. If a scraper, or some equivalent means, is used to remove excess bath from the film, then a roughened roll surface other than a grooved surface may be satisfactorily employed, for example, a sand-blasted surface should suffice.

From theoretical considerations, the ideal advancing roll of this invention would be a roll having a body concaved in such a manner as to provide a peripheral travel path for each individual lane of film of a length corresponding exactly to the length of each lane of film. This, however, is not a necessary requirement; apparently, because thin flexible films, such as those of regenerated cellulose, can be stretched to a moderate degree to contact a non-ideal roll sufficiently without being permanently distorted. Hence, there is considerable leeway in choosing the particular type of roughened surface and the particular concaved contour to be used in preparing an advancing roll in accordance with this invention. To further emphasize this rather important practical consideration, reference is made to FIGURES 3 through 7, which illustrate diagrammatically advancing roll of various designs.

The body of the roll illustrated in FIGURE 3 comprises a cylindrical center portion $a$, which makes up approximately ⅓ of the total length of the roll; conically tapered sections $b$, each of which is approximately ¼ the length of the roll; and rather short cylindrical end sections $c$ of a diameter equal to the diameter of the large, outside ends of the tapered section $b$ which is at least 0.2% greater than the diameter of the center $a$. The necessary surface roughness is provided by three pairs of twin, spiral grooves 18 originating at the center of the roll. Rolls of this type are generally preferred, because of their ease of preparation, and have been used to prevent wrinkling and folding of the edges of gel cellophane in all of the various liquid treating baths.

The roll illustrated in FIGURE 4 is composed of two conical sections *b*, the small ends of which meet at the center portion *a* of the roll. The ends of the roll are at least 0.2% larger in diameter than the diameter at the center *a*. A single pair of spiral grooves 18 provide transverse traction for film being advanced by the roll, while longitudinal grooves 20 provide most of the necessary peripheral traction. Rolls having this particular type of treated surface are particularly useful for simultaneously advancing a multiplicity of superimposed gel film, providing the grooves are of sufficient depth and width to permit deformation of the gel film (see U.S. Patent 2,839,785, to Stevens).

A truly concaved roll is illustrated in FIGURE 5. The two sections *b* comprising these rolls are smallest at their junction at the center portion *a* of the roll, but increase in diameter at an increasing rate with distance away from the center *a*, the ends being at least 0.2% larger than the center. A single pair of triple pitched grooves provide the surface roughness. Although truly concaved rolls are theoretically the ideal type for providing equal contact to all lanes of a film passing over them, such rolls are rather difficult to machine and, in actual practice, do not offer sufficient advantage to offset this disadvantage, hence they are not the most preferred variety.

FIGURE 6 illustrates a concaved roll having a triple twin, grooved surface and a body composed of a cylindrical center portion *a*, that separates two tapered sections *b*, which increase in diameter outward from the center section *a* to a final diameter equal to that of the short cylindrical end sections *c* which are at least 0.2% greater in diameter than the center section *a*. Theoretically this roll should approach the truly concaved roll (FIGURE 5) in action on film; however, it is also somewhat difficult to machine.

The roll illustrated in FIGURE 7 has a short cylindrical center portion *a*, separating two outwardly tapered conical sections *b*, the larger outer ends of which meet corresponding small ends of conical sections *d* of greater taper than sections *b*, and short cylindrical end sections *c* of a diameter equal to that of the larger outer ends of sections *d* which are 0.2% or more, larger than the diameter of the center section *a*. A single set of oppositely pitched spiral grooves in the roll surface provide the necessary roughness for traction in both the longitudinal and peripheral directions. The overall body contour of the tapered portions of this roll reasonably approximate genuine concavity and is more convenient to achieve by the usual milling machines.

The advancing roll of this invention has a straight axis of rotation. It may be machined from a single body of material, if desired, since it need not be sectional or have moving parts which are necessary in known spreader rolls, such as those of the bowed variety. The rolls of this invention operate satisfactorily rigidly mounted to rotate around a stationary axis, in contrast to certain known rolls which must be pivotally mounted and equipped with automatic shifting devices. Driven, concave, spirally grooved rolls advance gel film through the various treating liquids without imparting undue tension on the film in the machine direction, while known stationary, convex spreading device offer considerable resistance to the passage of the film over them and do not advance the film, hence separate advancing means must be provided. While the rolls of the present invention are generally used to advance film through treating liquids, they can be used for advancing thin extensible webs without wrinkling or folding regardless of the medium through which the webs are being passed.

What is claimed is:

1. A film advancing roll having a straight, fixed axis comprising: a cylindrical center portion and tapered sections separated by said center portion having small ends of the same diameter as said center portion and which vary in size from the diameter of the center portion outward to the diameter of the end portions, said end portions having a diameter of at least 0.2% greater than the diameter of said center portion, said roll having in its surface at least one pair of twin spiral grooves of equal and opposite pitch with each of said pair of twin spiral grooves leading from a point midway from the ends of said roll and extending toward opposite ends.

2. A film advancing roll having a straight fixed axis comprising: a short cylindrical center portion; two conical sections separated by said center portion having small ends adjacent to and of the same diameter as said center portion and end portions having a diameter of from 0.2 to 2% greater than the diameter of said center portion and two short cylindrical end sections having the same diameter as the end portions of said conical sections, said roll having in its surface three pairs of twin, spiral grooves of equal and opposite pitch with each of said pair of twin spiral grooves leading from a point midway from the ends of said roll and extending toward opposite ends.

3. A film advancing roll having a straight, fixed axis comprising: a cylindrical center portion and two conical sections, the small ends of which meet at said center portion and the large ends having a diameter of from 0.2 to 2% greater than the diameter of said center portion, said roll having in its surface longitudinal grooves and one pair of twin, spiral grooves of equal and opposite pitch with each of said grooves leading from a point midway from the ends of said roll and extending toward opposite ends.

4. A film advancing roll having a straight, fixed axis comprising: a short cylindrical center portion; two conical sections separated by said center portion having small ends adjacent to and of the same diameter as said center portion; two conical sections of greater taper than said first conical sections, the small ends of which meet and have the same diameter as the large ends of said first conical sections and the large ends having a diameter of from .02 to 2% greater than the diameter of said center portion and two short cylindrical end sections having the same diameter as the large ends of said second conical sections, said roll having in its surface one pair of twin, spiral grooves of equal and opposite pitch with each of said grooves leading from a point midway from the ends of said roll and extending toward opposite ends.

References Cited by the Examiner

UNITED STATES PATENTS

| | | | |
|---|---|---|---|
| 1,921,487 | 8/1933 | Smith | 226—189 X |
| 1,957,708 | 10/1934 | Bleibler. | |
| 2,000,079 | 5/1935 | Herndon | 18—15 X |
| 2,017,094 | 10/1935 | Hetzel. | |
| 2,287,768 | 6/1942 | Eckstein. | |
| 2,309,609 | 1/1943 | Branderberger et al. | 18—15 |
| 2,717,037 | 9/1955 | Goodwillie | 226—190 X |
| 3,052,917 | 9/1962 | Horn. | |
| 3,056,164 | 10/1962 | Reichel et al. | 226—193 X |

FOREIGN PATENTS 318,877 6/1934 Italy.

ALEXANDER H. BRODMERKEL, *Primary Examiner.*

MORRIS LIEBMAN, ROBERT F. WHITE, *Examiners.*

A. L. LEAVITT, F. WHISENHUNT,
*Assistant Examiners.*